United States Patent
Malekpour

(10) Patent No.: US 7,792,015 B2
(45) Date of Patent: Sep. 7, 2010

(54) BYZANTINE-FAULT TOLERANT SELF-STABILIZING PROTOCOL FOR DISTRIBUTED CLOCK SYNCHRONIZATION SYSTEMS

(75) Inventor: Mahyar R. Malekpour, Hampton, VA (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 7 days.

(21) Appl. No.: 12/187,458

(22) Filed: Aug. 7, 2008

(65) Prior Publication Data

US 2009/0040920 A1    Feb. 12, 2009

Related U.S. Application Data

(60) Provisional application No. 60/954,866, filed on Aug. 9, 2007.

(51) Int. Cl.
*G01R 31/08* (2006.01)

(52) U.S. Cl. .................. 370/216; 370/242; 370/503; 714/12; 714/55

(58) Field of Classification Search ............... None
See application file for complete search history.

(56) References Cited

U.S. PATENT DOCUMENTS

| | | | | |
|---|---|---|---|---|
| 4,979,191 A * | 12/1990 | Bond et al. | .................. | 375/357 |
| 6,671,821 B1 * | 12/2003 | Castro et al. | .................... | 714/4 |
| 2002/0129296 A1 * | 9/2002 | Kwiat et al. | .................. | 714/10 |
| 2009/0102534 A1 * | 4/2009 | Schmid et al. | .............. | 327/292 |
| 2009/0122812 A1 * | 5/2009 | Steiner et al. | ................ | 370/503 |

* cited by examiner

*Primary Examiner*—Chi H. Pham
*Assistant Examiner*—Shick Hom
(74) *Attorney, Agent, or Firm*—Robin W. Edwards

(57) ABSTRACT

A rapid Byzantine self-stabilizing clock synchronization protocol that self-stabilizes from any state, tolerates bursts of transient failures, and deterministically converges within a linear convergence time with respect to the self-stabilization period. Upon self-stabilization, all good clocks proceed synchronously. The Byzantine self-stabilizing clock synchronization protocol does not rely on any assumptions about the initial state of the clocks. Furthermore, there is neither a central clock nor an externally generated pulse system. The protocol converges deterministically, is scalable, and self-stabilizes in a short amount of time. The convergence time is linear with respect to the self-stabilization period.

22 Claims, 7 Drawing Sheets

BYZANTINE-FAULT TOLERANT SELF-STABILIZING PROTOCOL FOR DISTRIBUTED CLOCK SYNCHRONIZATION SYSTEMS

Pursuant to 35 U.S.C. §119, the benefit of priority from provisional application 60/954,866, with a filing date of Aug. 9, 2007, is claimed for this non-provisional application.

ORIGIN OF THE INVENTION

The present invention was made by an employee of the United States Government and may be manufactured and used by or for the Government of the United States of America for governmental purposes without the payment of any royalties thereon or therefor.

FIELD OF THE INVENTION

The present invention generally relates to fault tolerant distributed computer systems, and, more particularly, relates to systems and methods for self-stabilizing a system from an arbitrary state in the presence of a bounded number of Byzantine faults.

BACKGROUND OF THE INVENTION

Synchronization and coordination algorithms are part of distributed computer systems. Clock synchronization algorithms are essential for managing the use of resources and controlling communication in a distributed system. Also, a fundamental criterion in the design of a robust distributed system is to provide the capability of tolerating and potentially recovering from failures that are not predictable in advance. Overcoming such failures is most suitably addressed by tolerating Byzantine faults. A Byzantine fault is an arbitrary fault that occurs during the execution of an algorithm by a distributed system. It encompasses those faults that are commonly referred to as "crash failures" and "send and omission failures." When a Byzantine failure has occurred, the system may respond in any unpredictable way, unless it is designed to have Byzantine fault tolerance. The object of Byzantine fault tolerance is to be able to defend against a Byzantine failure, in which a component of some system not only behaves erroneously, but also fails to behave consistently when interacting with multiple other components. Correctly functioning components of a Byzantine fault tolerant system will be able to reach the same group decisions regardless of Byzantine faulty components.

There are upper bounds on the percentage of traitorous or unreliable components, however. A Byzantine-fault model encompasses all unexpected failures, including transient ones, within the limitations of the maximum number of faults at a given time. A distributed system tolerating as many as 'F' Byzantine faults requires a network size of more than 3F nodes. Byzantine agreement cannot be achieved for fewer than 3F+1 nodes, as at least 3F+1 nodes are necessary for clock synchronization in the presence of F Byzantine faults.

A distributed system is defined to be self-stabilizing if, from an arbitrary state and in the presence of a bounded number of Byzantine faults, it is guaranteed to reach a legitimate state in a finite amount of time and remain in a legitimate state as long as the number of Byzantine faults is within a specific bound. A legitimate state is a state in which all good clocks in the system are synchronized within a given precision bound. Therefore, a self-stabilizing system is able to start in a random state and recover from transient failures after the faults dissipate.

There are known algorithms that address permanent faults, where the issue of transient failures is either ignored or inadequately addressed. There are known efficient Byzantine clock synchronization algorithms that are based on assumptions on initial synchrony of the nodes or existence of a common pulse at the nodes. There are known clock synchronization algorithms that are based on randomization and, therefore, are non-deterministic. Some known clock synchronization algorithms have provisions for initialization and/or reintegration. However, solving these special cases is insufficient to make the algorithm self-stabilizing. A self-stabilizing algorithm encompasses these special scenarios without having to address them separately. The main challenges associated with self-stabilization are the complexity of the design and the proof of correctness of the protocol. Another difficulty is achieving efficient convergence time for the proposed self-stabilizing protocol.

BRIEF SUMMARY OF THE INVENTION

The object of the present invention is to overcome the aforementioned drawbacks of current Byzantine-fault tolerant algorithms and to provide a rapid Byzantine self-stabilizing clock synchronization protocol that self-stabilizes from any state, tolerates bursts of transient failures, and deterministically converges within a linear convergence time with respect to the self-stabilization period. Upon self-stabilization, all good clocks proceed synchronously.

In one embodiment of the invention, a system for self-stabilizing from an arbitrary state in the presence of a bounded number of Byzantine faults comprises a plurality of nodes in communication with each other node, with each node comprising a state machine, a plurality of monitors, a local physical oscillator, and two logical time clocks driven by the local physical oscillator. The quantity of monitors is equal to one less than the quantity of nodes. Each monitor is in communication with the state machine, each monitor is configured to receive self-stabilization messages from a different corresponding node, and each monitor is configured to determine a current state of the corresponding node. The state machine is configured to describe a current state of the node (either a maintain-state or a restore-state). The state machine is configured to transmit self-stabilization messages to all other nodes, the self-stabilization messages comprising either a Resync message indicating that the node is attempting to engage in resynchronization with all other nodes or an Affirm message indicating that the node is transitioning to another state in an attempt to synchronize or indicating that the node is currently synchronized. The state machine transitions the node from the maintain-state to the restore-state if a predefined number of valid Resync messages have been received. The state machine transitions the node from the restore-state to the maintain-state if (1) the node is in the restore-state, (2) a predefined number of events have occurred within a same number of predefined time intervals, each event occurring when a predefined number of valid self-stabilization messages have been received by the monitors within one predefined time interval, and (3) the monitors have not received a valid Resync message during a most recent event occurrence. Importantly, the system does not comprise a central clock that is used by the nodes during self-stabilization, and the nodes do not use an externally generated global pulse during self-stabilization.

Each state machine may be configured to transmit a Resync message when the state machine transitions the node from the maintain-state to the restore-state or when a Resync timeout occurs. Each state machine may be configured to transmit an Affirm message when a predefined number of valid self-stabilization messages have been received by as many of the corresponding monitors within an Affirm timeout interval or when an Affirm timeout interval has lapsed. The predefined number of valid self-stabilization messages may equal one minus a sum of all good nodes. The Affirm timeout interval may equal a time difference between two most recent consecutive Affirm messages received from a good node during steady state. The predefined number of valid Resync messages may equal one plus a sum of all faulty nodes. The predefined number of events may equal two times a sum of all faulty nodes. The predefined time intervals may equal a time difference between two most recent consecutive Affirm messages received from a good node during steady state. The monitors may be further configured to determine if the received self-stabilization messages are valid and to store most recently received valid messages.

The two logical time clocks may comprise a State_Timer and a Local_Timer. The Local_Timer may be incremented once every tick of the local physical oscillator. The State_Timer may be incremented once every time difference between two most recent consecutive Affirm messages received from a good node during steady state. The State_Timer may be reset either (1) when the state machine transitions the node from the maintain-state to the restore-state or (2) when the state machine transitions the node from the restore-state to the maintain-state. The Local_Timer may be reset either (1) when the Local_Timer reaches a predefined maximum allowed value or (2) when the node has transitioned to the Maintain state and remained in the Maintain state for $\Delta_{Precision}$ ticks of the local physical oscillator, where $\Delta_{Precision}$ is a maximum guaranteed self-stabilization precision of the system.

In addition to the system for self-stabilizing from an arbitrary state in the presence of a bounded number of Byzantine faults as described above, other aspects of the present invention are directed to corresponding methods for self-stabilizing from an arbitrary state in the presence of a bounded number of Byzantine faults.

BRIEF DESCRIPTION OF THE DRAWING(S)

Having thus described the invention in general terms, reference will now be made to the accompanying drawings, which are not necessarily drawn to scale, and wherein:

Figure 7A:
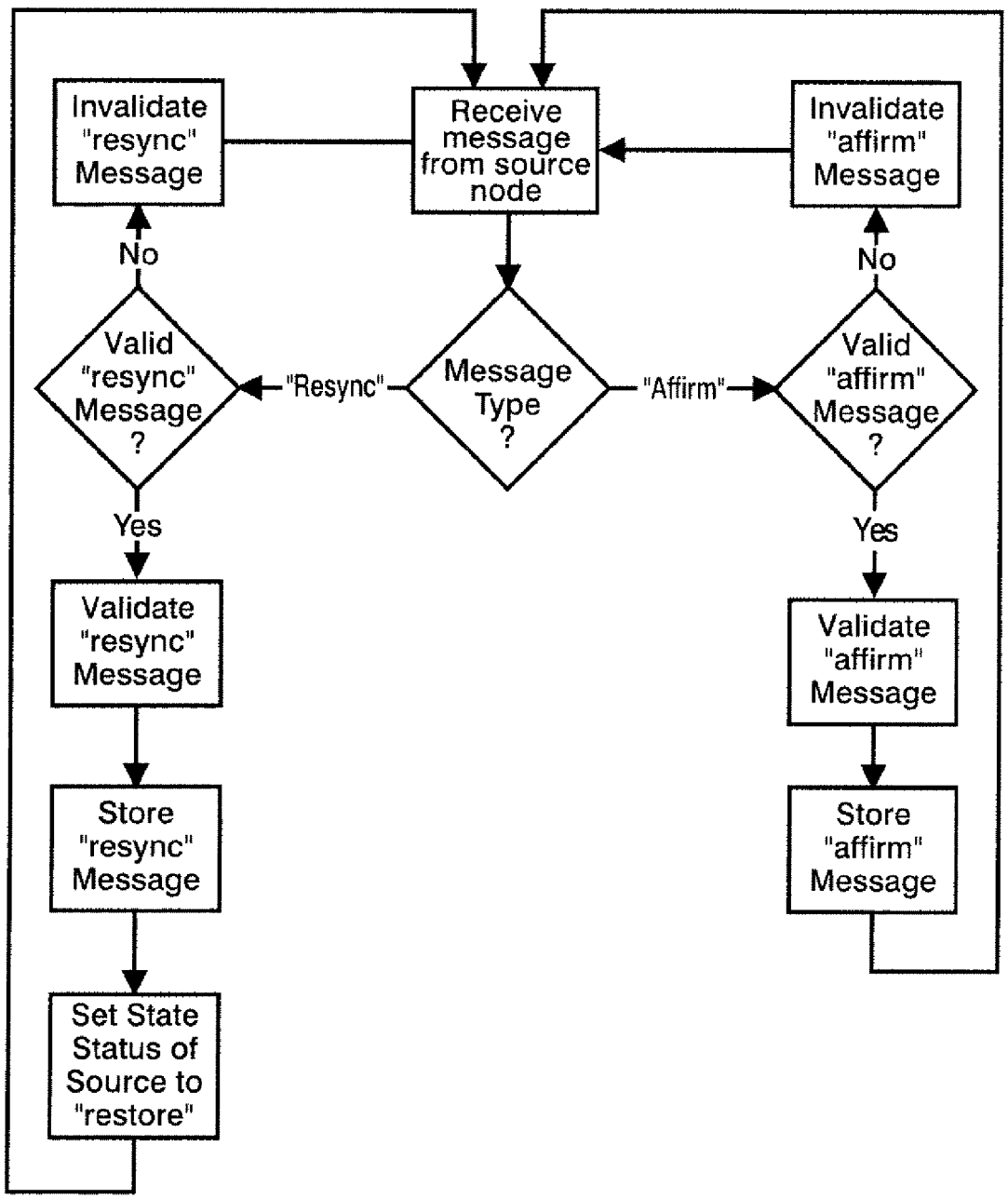
Figure 7B:
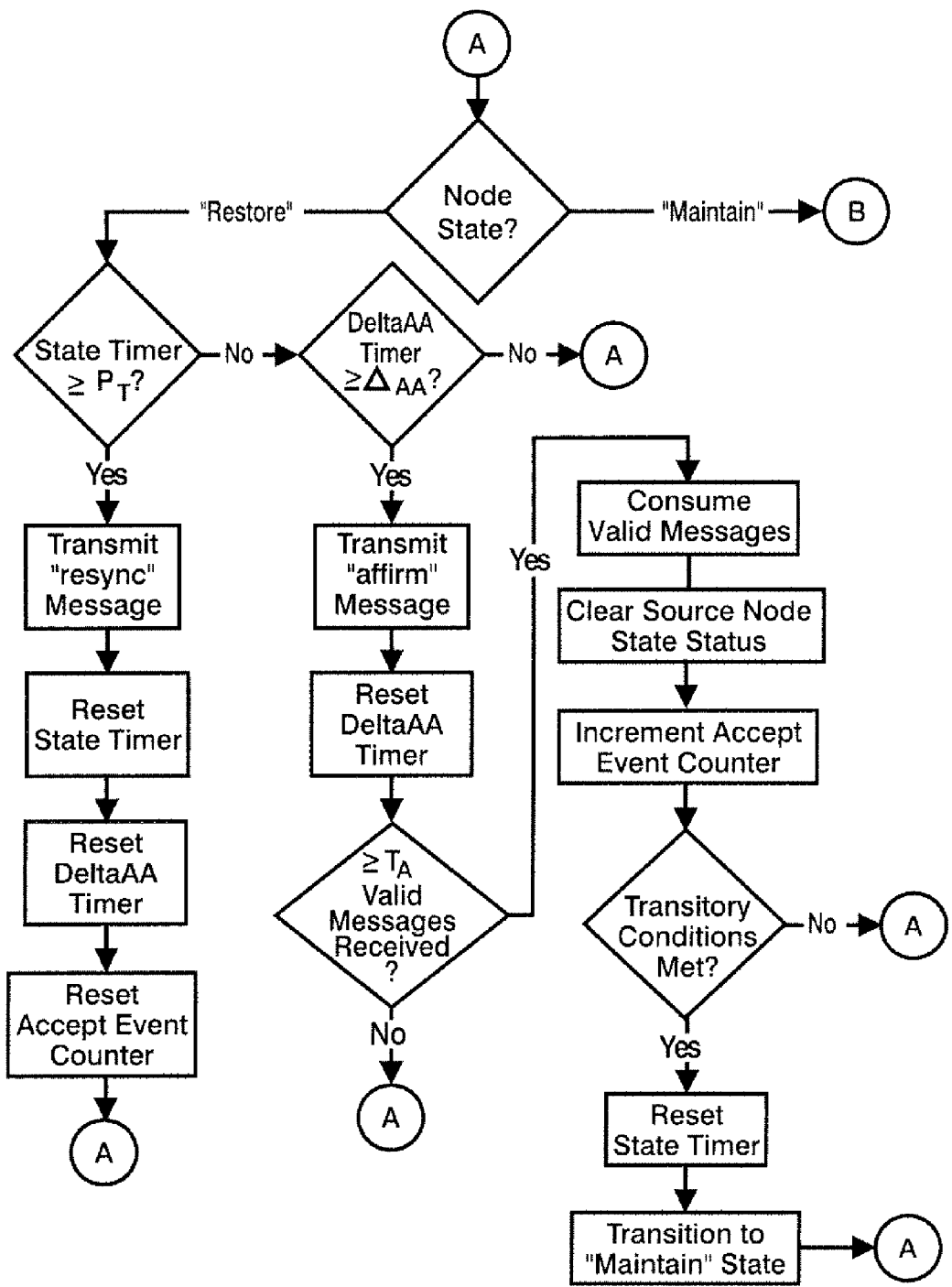
Figure 7C:
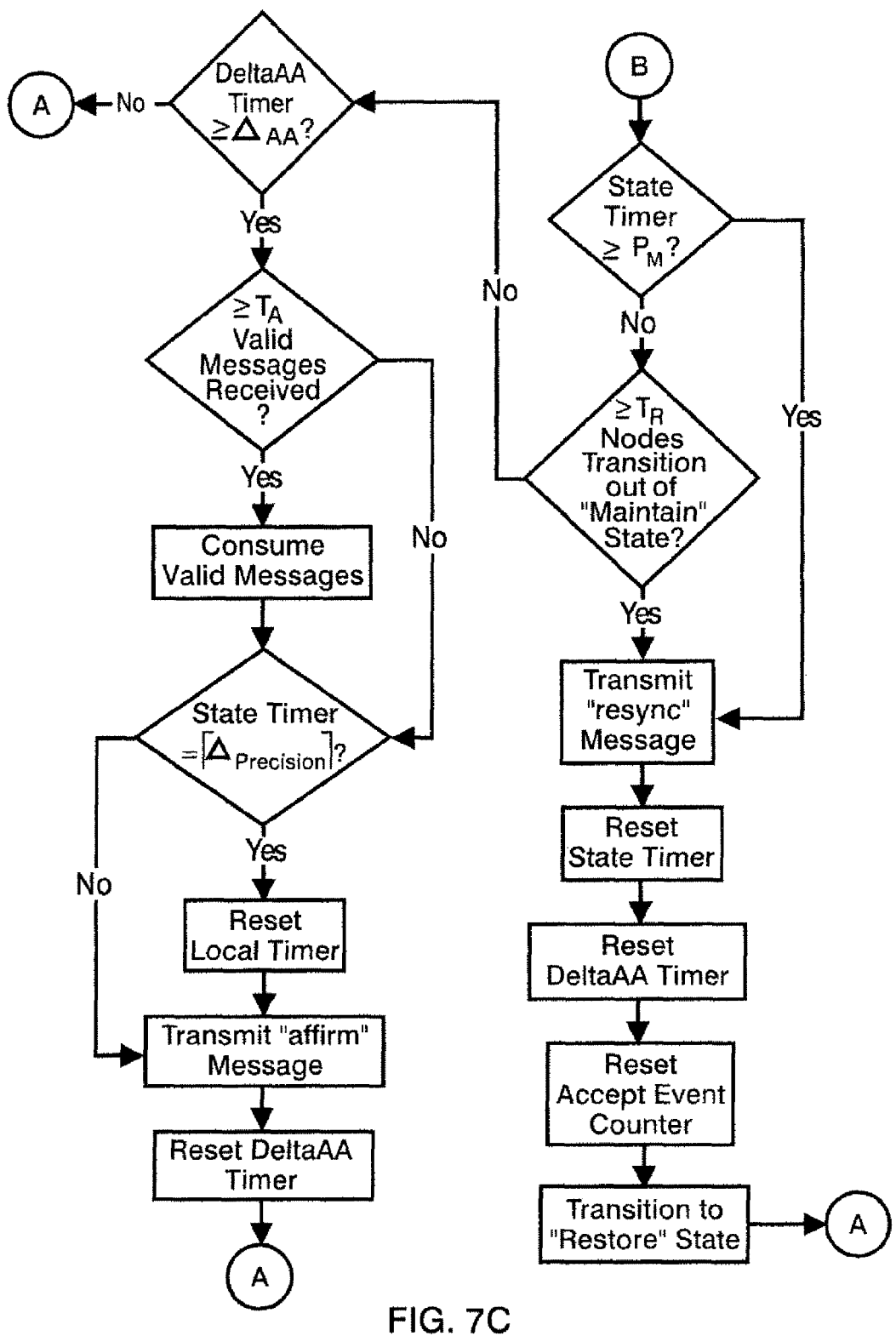
Figure 8:
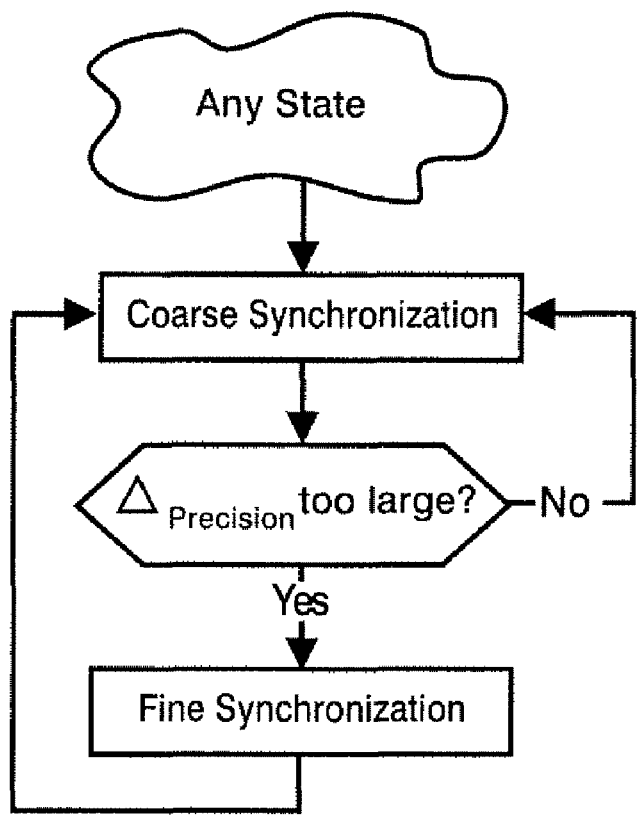
Figure 9:
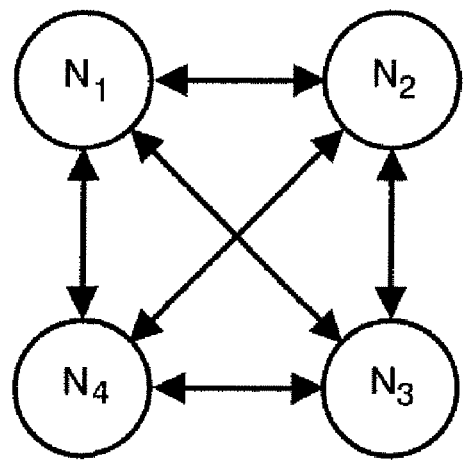

FIGS. 7A-C is a flow diagram illustrating the self-stabilization protocol, in accordance with embodiments of the invention;

FIG. 8 illustrates the interplay of Coarse and Fine level protocols in a self-stabilizing system, in accordance with embodiments of the invention; and FIG. 9 illustrates a four-node fully-connected graph of a self-stabilizing system, in accordance with embodiments of the invention.

DETAILED DESCRIPTION OF THE INVENTION

The present invention will now be described more fully hereinafter with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Further discussion of the present invention is provided in Mahyar R. Malekpour, "A Byzantine-Fault Tolerant Self-Stabilizing Protocol for Distributed Clock Synchronization Systems," NASA/™-2006-214322, August 2006; Mahyar R. Malekpour, "Model Checking a Byzantine-Fault-Tolerant Self-Stabilizing Protocol for Distributed Clock Synchronization Systems," NASA/™-2007-215083, November 2007; Mahyar R. Malekpour, "A Byzantine-Fault Tolerant Self-Stabilizing Protocol for Distributed Clock Synchronization Systems," 8$^{th}$ International Symposium on Stabilization, Safety, and Security of Distributed Systems, November 2006; and Mahyar R. Malekpour, "Verification of a Byzantine-Fault Tolerant Self-Stabilizing Protocol for Clock Synchronization," 2008 IEEE Aerospace Conference, March 2008; each incorporated by reference herein in their entirety.

Embedded distributed systems have become an integral part of safety-critical computing applications, necessitating system designs that incorporate fault tolerant clock synchronization in order to achieve ultra-reliable assurance levels. Many efficient clock synchronization protocols do not, however, address Byzantine failures, and most protocols that do tolerate Byzantine failures do not self-stabilize. Of the Byzantine self-stabilizing clock synchronization algorithms that exist in the literature, they are based on either unjustifiably strong assumptions about initial synchrony of the nodes or on the existence of a common pulse at the nodes. The Byzantine self-stabilizing clock synchronization protocol presented here does not rely on any assumptions about the initial state of the clocks. Furthermore, there is neither a central clock nor an externally generated pulse system. The proposed protocol converges deterministically, is scalable, and self-stabilizes in a short amount of time. The convergence time is linear with respect to the self-stabilization period.

The underlying topology considered here is a network of K nodes that communicate by exchanging messages through a set of communication channels. The communication channels are assumed to connect a set of source nodes to a set of destination nodes such that the source of a given message is distinctly identifiable from other sources of messages. This system of K nodes can tolerate a maximum of F Byzantine faulty nodes, where $K \geq 3F+1$. Therefore, the minimum number of good nodes in the system, G, is given by $G=K-F$ and thus $G \geq (2F+1)$ nodes. Let $K_G$ represent the set of good nodes. The nodes communicate with each other by exchanging broadcast messages. Broadcast of a message to all other nodes is realized by transmitting the message to all other nodes at the same time. The source of a message is assumed to be uniquely identifiable. The communication network does not guarantee any order of arrival of a transmitted message at the receiving nodes. A consistent delivery order of a set of messages does not necessarily reflect the temporal or causal order of the events.

Each node is driven by an independent local physical oscillator. The oscillators of good nodes have a known bounded drift rate, $1 \gg \rho \geq 0$, with respect to real time. Each node has two logical time clocks, Local_Timer and State_Timer, which locally keep track of the passage of time as indicated by the physical oscillator. In the context of this application, all references to clock synchronization and self-stabilization of the system are with respect to the State_Timer and the Local_Timer of the nodes. There is neither a central clock nor an externally generated global pulse. The communication channels and the nodes can behave arbitrarily, provided that eventually the system adheres to the system assumptions.

Figure 1:
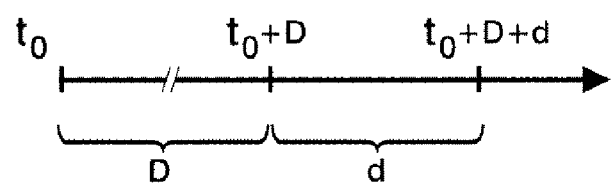
FIG. 1 illustrates a timeline of event-response delay and network imprecision of a self-stabilizing system, in accordance with one embodiment of the invention.

The latency of interdependent communications between the nodes is expressed in terms of the minimum event-response delay, D, and network imprecision, d. These parameters are described with the help of FIG. 1. In FIG. 1, a message transmitted by node $N_i$ at real time $t_0$ is expected to arrive at all destination nodes $N_j$, be processed, and subsequent messages generated by $N_j$ within the time interval of $[t_0+D, t_0+D+d]$ for all $N_j \epsilon K_G$. Communication between independently clocked nodes is inherently imprecise. The network imprecision, d, is the maximum time difference between all good receivers, $N_j$, of a message from $N_i$ with respect to real time. The imprecision is due to the drift of the clocks with respect to real time, jitter, discretization error, and slight variations in the communication delay due to various causes such as temperature effects and differences in the lengths of the physical communication medium. These two parameters are assumed to be bounded such that $D \geq 1$ and $d \geq 0$ and both have values with units of real time nominal tick. For the remainder of this application, all references to time are with respect to the nominal tick and are simply referred to as clock ticks.

Protocol Description

The self-stabilization problem has two facets. First, it is inherently event-driven and, second, it is time-driven. Most attempts at solving the self-stabilization problem have focused only on the event-driven aspect of this problem. Additionally, all efforts toward solving this problem must recognize that the system undergoes two distinct phases, unstabilized and stabilized, and that once stabilized, the system state needs to be preserved. The protocol presented here properly merges the time and event driven aspects of this problem in order to self-stabilize the system in a gradual and yet timely manner. Furthermore, this protocol is based on the concept of a continual vigilance of state of the system in order to maintain and guarantee its stabilized status, and a continual reaffirmation of nodes by declaring their internal status. Finally, initialization and/or reintegration are not treated as special cases. These scenarios are regarded as inherent part of this self-stabilizing protocol.

The self-stabilization events are captured at a node via a selection function that is based on received valid messages from other nodes, When such an event occurs, it is said that a node has accepted or that an accept event has occurred. When the system is stabilized, it is said to be in the steady state.

Figure 2:
FIG. 2 illustrates a timing diagram of transmissions of a good node of a self-stabilizing system during the steady state, in accordance with embodiments of the invention.

In order to achieve self-stabilization, the nodes communicate by exchanging two self-stabilization messages labeled Resync and Affirm. The Resync message reflects the time-driven aspect of this self-stabilization protocol, while the Affirm message reflects the event-driven aspect of it. The Resync message is transmitted when a node realizes that the system is no longer stabilized or as a result of a resynchronization timeout. It indicates that the originator of the Resync message has to reset and try to reengage in the self-stabilization process with other nodes. The Affirm message is transmitted periodically and at specific intervals primarily in response to a legitimate self-stabilization accept event at the node. The Affirm message either indicates that the node is in the transition process to another state in its attempt toward synchronization, or reaffirms that the node will remain synchronized. The timing diagram of transmissions of a good node during the steady state is depicted in FIG. 2. In the figures, Resync messages are represented as 'R' and Affirm messages are represented as 'A'. The line segments indicate the time of the transmission of messages. As depicted in FIG. 2, the expected sequence of messages transmitted by a good node is a Resync message followed by a number of Affirm messages, i.e. RAAA . . . AAARAA. The exact number of consecutive Affirm messages will be accounted for later in this application.

The time difference between the interdependent consecutive events is expressed in terms of the minimum event-response delay, D, and network imprecision, d. As a result, the approach presented here is expressed as a self-stabilization of the system as a function of the expected time separation between the consecutive Affirm messages, which may be termed '$\Delta_{AA}$'. To guarantee that a message from a good node is received by all other good nodes before a subsequent message is transmitted, $\Delta_{AA}$ is constrained such that $\Delta_{AA} \geq (D+d)$. Unless stated otherwise, all time dependent parameters of this protocol are measured locally and expressed as functions of $\Delta_{AA}$.

Figure 3:
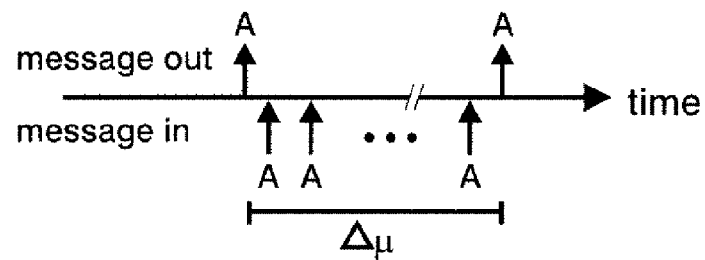
FIG. 3 illustrates typical activities of $N_i$ between two A messages in a stabilized system, in accordance with embodiments of the invention.

In FIG. 3, node $N_i$ is shown to transmit two consecutive Affirm messages. In the steady state, $N_i$ receives one Affirm message from every good node between any two consecutive Affirm messages it transmits. Since the messages may arrive at any time after the transmission of an Affirm message, the accept event can occur at any time prior to the transmission of the next Affirm message.

Three 'fundamental parameters' characterize the self-stabilization protocol presented here, namely K, D, and d (all defined above). The number of faulty nodes, F, the number of good nodes, G, and the remaining parameters that are subsequently enumerated are 'derived parameters' and are based on the three fundamental parameters. Furthermore, except for K, F, G, $T_A$, and $T_R$ which are integer numbers, all other parameters are real numbers. In particular, $\Delta_{AA}$ is used as a threshold value for monitoring of proper timing of incoming and outgoing Affirm messages. The derived parameters $T_A$=G−1 and $T_R$=F+1 are used as thresholds in conjunction with the Affirm and Resync messages, respectively.

The Monitor

Figure 4:
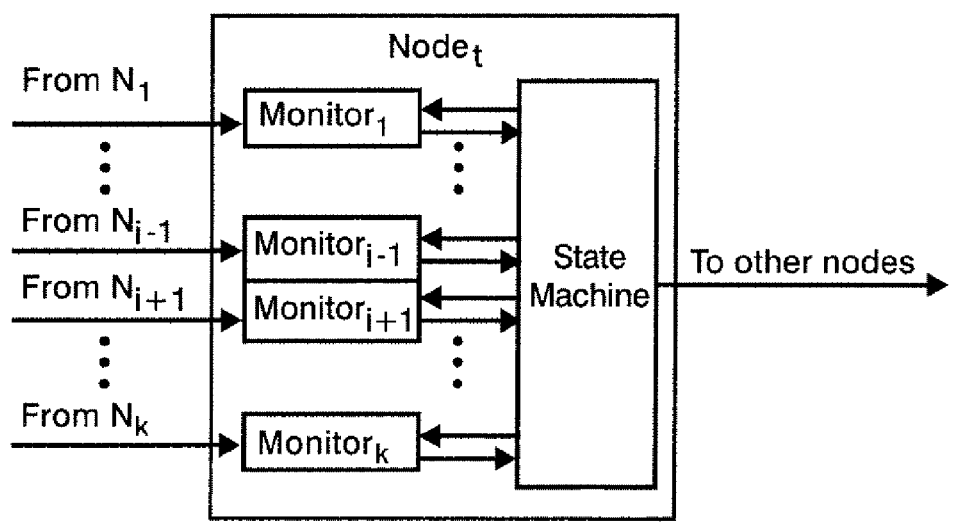
FIG. 4 is a block diagram of the $i_{th}$ node, $N_i$, of a self-stabilizing system with its monitors and state machine, in accordance with embodiments of the invention.

The transmitted messages to be delivered to the destination nodes are deposited on communication channels. Each node comprises a state machine and a plurality of monitors, as illustrated in FIG. 4. To closely observe the behavior of other nodes, a node employs (K−1) monitors, one monitor for each source of incoming messages as shown in FIG. 4. A node neither uses nor monitors its own messages. The distributed observation of other nodes localizes error detection of incoming messages to their corresponding monitors, and allows for modularization and distribution of the self-stabilization protocol process within a node. A monitor keeps track of the activities of its corresponding source node. A monitor detects proper sequence and timeliness of the received messages from its corresponding source node. A monitor reads, evaluates, time stamps, validates, and stores only the last message it receives from that node. Additionally, a monitor ascertains the health condition of its corresponding source node by keeping track of the current state of that node. As K increases so does the number of monitors instantiated in each node. The monitors may be implemented as separate physical components from the nodes or may be logically implemented implicitly as part of the node functions.

The State Machine

Figure 5:
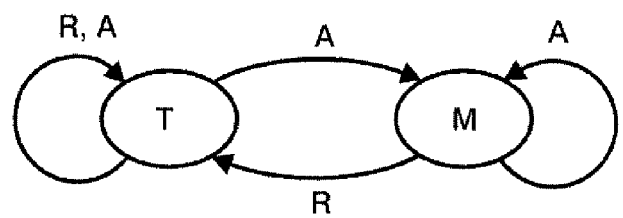
FIG. 5 illustrates message flow within a node state machine of a self-stabilizing system, in accordance with embodiments of the invention.

The assessment results of the monitored nodes are utilized by the node in the self-stabilization process. Again, the node consists of a state machine and a set of (K−1) monitors. The state machine has two states, Restore state ('T') and Maintain state ('M'), that reflect the current state of the node in the system as shown in FIG. 5. The state machine describes the collective behavior of the node, $N_i$, utilizing assessment results from its monitors, $M_1 \ldots M_{i-1}, M_{i+1} \ldots M_K$ as shown in FIG. 4, where $M_j$ is the monitor for the corresponding node $N_j$. In addition to the behavior of its corresponding source node, a monitor's internal status is influenced by the current state of the node's state machine. In a master-slave fashion, when the state machine transitions to another state it directs the monitors to update their internal status.

The 'transitory conditions' enable the node to migrate to the Maintain state and are defined as: (1) the node is in the Restore state; (2) at least 2F accept events in as many $\Delta_{AA}$ intervals have occurred after the node entered the Restore state; and (3) no valid Resync messages are received for the last accept event. The 'transitory delay' is the length of time a node stays in the Restore state. The minimum required duration for the transitory delay is 2F $\Delta_{AA}$ after the node enters the Restore state. The maximum duration of the transitory delay is dependent on the number of additional valid Resync messages received. Validity of received messages is defined below. When the system is stabilized, the maximum delay is a result of receiving valid Resync messages from all faulty nodes. Since there are at most F faulty nodes present, during the steady state operation the duration of the transitory delay is bounded by [2F $\Delta_{AA}$, 3F $\Delta_{AA}$].

A node in either of the Restore or Maintain state periodically transmits an Affirm message every $\Delta_{AA}$. When in the Restore state, a node either will meet the transitory conditions and transition to the Maintain state, or will remain in the Restore state for the duration of the self-stabilization period until it times out and transmits a Resync message. When in the Maintain state, a node either will remain in the Maintain state for the duration of the self-stabilization period until it times out, or will unexpectedly transition to the Restore state because $T_R$ other nodes have transitioned out of the Maintain state. At the transition, the node transmits a Resync message.

The self-stabilization period is defined as the maximum time interval (during the steady state) that a good node engages in the self-stabilization process. In this protocol, the self-stabilization period depends on the current state of the node. Specifically, the self-stabilization period for the Restore state is represented by $P_T$ and the self-stabilization period for the Maintain state is represented by $P_M$. $P_T$ and $P_M$ are expressed in terms of $\Delta_{AA}$. The length of time a good node stays in the Restore state is denoted by $L_T$. During the steady state, $L_T$ is always less than $P_T$. The time a good node stays in the Maintain state is denoted by $L_M$. When the system is stabilized, $L_M$ is less than or equal to $P_M$. The effective self-stabilization period, $P_{Effective}$, is the time interval between the last two consecutive resets of the Local_Timer of a good node in a stabilized system, where $P_{Effective}=L_T+L_M<P_T+P_M$.

Figure 6:
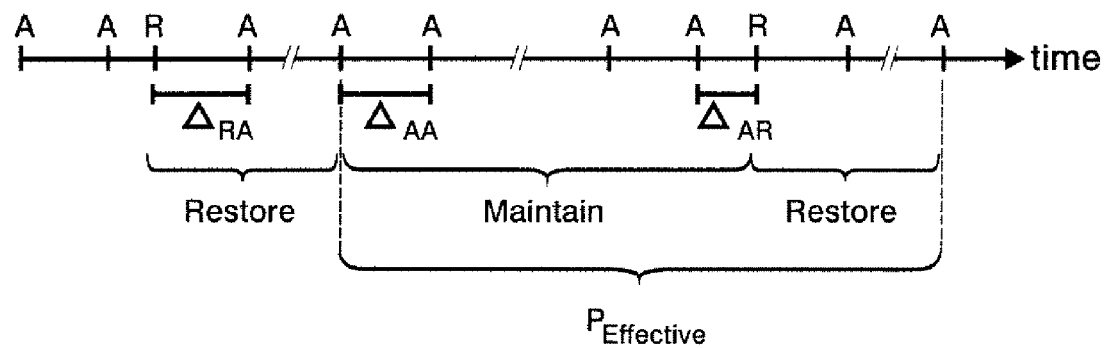
FIG. 6 illustrates a timing diagram of activities of a good node of a self-stabilizing system during the steady state, in accordance with embodiments of the invention.

In FIG. 6 the transitions of a node from the Restore state to the Maintain state (during the steady state) are depicted along a timeline of activities of the node. The line segments in FIG. 6 indicate timing and order of the transmission of messages along the time axis. Two new parameters, $\Delta_{RA}$ and $\Delta_{AR}$, are introduced in this figure in order to clarify other aspects of this protocol's behavior. These parameters are defined in terms of $\Delta_{AA}$. Although a Resync message is transmitted immediately after the node realizes that it is no longer stabilized, i.e. $0<\Delta_{AR}\leq\Delta_{AA}$, an Affirm message is transmitted once every $\Delta_{AA}$, i.e. $\Delta_{RA}=\Delta_{AA}$.

A node keeps track of time by incrementing a logical time clock, State_Timer, once every $\Delta_{AA}$. After the State_Timer reaches $P_T$ or $P_M$, depending on the current state of the node, the node (1) experiences a timeout, (2) transmits a new Resync message, (3) resets the State_Timer, (4) transitions to the Restore state, and (5) attempts to resynchronize with other nodes. If the node was in the Restore state it remains in that state after the timeout. The current value of the State_Timer reflects the duration of the current state of the node. It also provides insight in assessing the state of the system in the self-stabilization process.

In addition to the State_Timer, the node maintains the logical time clock Local_Timer. The Local_Timer is incremented once every local clock tick and is reset when either (1) when the Local_Timer reaches a predefined maximum allowed value or (2) when the node has transitioned to the Maintain state and remained in that state for the duration of ResetLocalTimerAt local clock ticks, where ResetLocalTimerAt is equal to $\Delta_{Precision}$ and where $\Delta_{Precision}$ is the maximum guaranteed self-stabilization precision. ResetLocalTimerAt can alternatively be any value in the range specified by equation: $\Delta_{Precision}\leq\text{ResetLocalTimerAt}\leq(P_M-\Delta_{Precision})$. The Local_Timer is intended to be used by higher level protocols and is used in assessing the state of the system in the self-stabilization process.

The monitor's status reflects its perception of its corresponding source node. In particular, a monitor keeps track of the incoming messages from its corresponding source and ensures that only valid messages are stored. If the expected time of arrival of a message is violated or if the message arrives out of the expected sequence, then the message is marked as invalid. Otherwise, the message is marked as valid and stored for the host node's consumption. It is important to note that this protocol is expected to be used as the fundamental mechanism in bringing and maintaining a system within a known synchronization bound. This protocol neither maintains a history of past behavior of the nodes nor attempts to classify the nodes into good and faulty ones. All such determination about the health status of the nodes in the system is assumed to be done by higher level mechanisms.

Message Sequence

An 'expected sequence' is defined as a stream of Affirm messages enclosed by two Resync messages, in which all received messages arrive within their expected arrival times. The time interval between the last (i.e., most recent) two Resync messages is represented by $\Delta_{RR}$. The following are three example sequences, in which '-' represents a missing message:

RAAA . . . AAAR expected sequence, all A messages present;
RA-A . . . A-R unexpected message sequence, missing A messages;
R- . . . -R unexpected message sequence, no A messages present.

When a node is in the Restore state, the node's output sequence of messages has one of two patterns. If the node does not transition to the Maintain state, the node times out after $P_T$ and the node's expected sequence of output messages will be RAAA . . . AAAR, consisting of $P_T$ consecutive A messages. In this case, $\Delta_{RR}=P_T$. On the other hand, when the node synchronizes with other nodes, the node transitions to the Maintain state before timing out, and the node's expected sequence of output messages will have at least 2F Affirm messages, followed by those Affirm messages produced in the Maintain state. The shortest amount of time it takes a node to transition to the Maintain state is $2F\Delta_{AA}$. The shortest amount of time the node stays in the Maintain state is $\Delta_{AR}$. Therefore, the time separation between any two consecutive Resync messages from a good node is given by $\Delta_{RR} \geq 2F\Delta_{AA}+\Delta_{AR}$. As a result, the shortest expected sequence consists of 2F A messages enclosed by two R messages with a duration of $\Delta_{RR,min}=2F\Delta_{AA}+1$ clock ticks.

When a node is in the Maintain state, the node has two possible output sequences of messages. If the node times out after $P_M$, the node's expected sequence of output messages will be RAAA . . . AAAR consisting of an R message, followed by A messages for when the node was in the Restore state, followed by at least $P_M$ consecutive A messages for the duration of the Maintain state, followed by another R message. Therefore, $(P_T+P_M)>\Delta_{RR}$, in other words, $\Delta_{RR,max}=(P_T+P_M)$. On the other hand, when the node abruptly transitions out of the Maintain state, the node's output sequence of messages will consist of fewer Affirm messages. The sequence consists of an R message, followed by A messages for when the node was in the Restore state, followed by A messages for the duration of the Maintain state, followed by another R message.

As depicted in FIG. 6, starting from the last transmission of the Resync message, consecutive Affirm messages are transmitted at $\Delta_{AA}$ intervals. At the receiving nodes, the following definitions apply:

a message (Resync or Affirm) from a given source is valid if it is the first message from that source;

an Affirm message from a given source is early if it arrives earlier than $(\Delta_{AA-d})$ of its previous valid message (Resync or Affirm);

a Resync message from a given source is early if it arrives earlier than $\Delta_{RR,min}$ of its previous valid Resync message;

an Affirm message from a given source is valid if it is not early; and a Resync message from a given source is valid if it is not early.

The protocol works when the received messages do not violate their timing requirements. However, in addition to inspecting the timing requirements, examining the expected sequence of the received messages provides stronger error detection at the nodes.

Protocol Functions

The functions used in this protocol are described in this section. Two functions, InvalidAffirm( ) and InvalidResync( ), are used by the monitors. The InvalidAffirm( ) function determines whether or not a received Affirm message is valid. The InvalidResync( ) function determines if a received Resync message is valid. When either of these functions returns a true value, it is indicative of an unexpected behavior by the corresponding source node. The Accept( ) function is used by the state machine of the node in conjunction with the threshold value $T_A=G-1$. When at least $T_A$ valid messages (Resync or Affirm) have been received, this function returns a true value indicating that an accept event has occurred and such event has also taken place in at least F other good nodes. When a node accepts, the node consumes all valid messages used in the accept process by the corresponding function. Consumption of a message is the process by which a monitor is informed that its stored message, if it existed and was valid, has been utilized by the state machine.

The Retry( ) function is used by the state machine of the node with the threshold value $T_R=F+1$. This function determines if at least $T_R$ other nodes have transitioned out of the Maintain state. A node, via its monitors, keeps track of the current state of other nodes. When at least $T_R$ valid Resync messages from as many nodes have been received, this function returns a true value indicating that at least one good node has transitioned to the Restore state. This function is used to transition from the Maintain state to the Restore state. This function triggers the node to transmit a Resync message.

The TransitoryConditionsMet( ) function is used by the state machine of the node to determine proper timing of the transition from the Restore state to the Maintain state. This function keeps track of the accept events, by incrementing the Accept_Event_Counter, to determine if at least 2F accept events in as many $\Delta_{AA}$ intervals have occurred. This function returns a true value when the transitory conditions (defined above) are met.

The TimeOutRestore( ) function uses $P_T$ as a boundary value and asserts a timeout condition when the value of the State_Timer has reached $P_T$. Such timeout triggers the node to reengage in another round of self-stabilization process. This function is used when the node is in the Restore state.

The TimeOutMaintain( ) function uses $P_M$ as a boundary value and asserts a timeout condition when the value of the State_Timer has reached $P_M$. Such timeout triggers the node to reengage in another round of synchronization. This function is used when the node is in the Maintain state. This timeout triggers the node to transmit a Resync message, and thus may be generically termed a "Resync timeout."

In addition to the above functions, the state machine utilizes the TimeOutAcceptEvent( ) function. This function is used to regulate the transmission time of the next Affirm message. This function maintains a DeltaAA_Timer by incrementing it once per local clock tick and once it reaches the transmission time of the next Affirm message, $\Delta_{AA}$, it returns a true value. In the advent of such timeout, the node transmits an Affirm message. Thus, this timeout may be generically termed an "Affirm timeout," and $\Delta_{AA}$ may be generically termed the Affirm timeout interval.

System Assumptions

The following system assumptions apply to a system capable of self-stabilizing using the protocol of the present invention: (1) the source of the transient faults has dissipated; (2) all good nodes actively participate in the self-stabilization process and execute the protocol; (3) at most F of the nodes are faulty; (4) the source of a message is distinctly identifiable by the receivers from other sources of messages; (5) a message sent by a good node will be received and processed by all other good nodes within $\Delta_{AA}$, where $\Delta_{AA} \geq (D+d)$; and (6) the initial values of the state and all variables of a node can be set to any arbitrary value within their corresponding range. In an implementation, it is expected that some local capabilities exist to enforce type consistency of all variables.

The Self-Stabilizing Clock Synchronization Problem

To simplify the presentation of this protocol, it is assumed that all time references are with respect to a real time $t_0$, where $t_0=0$ when the system assumptions are satisfied, and for all $t>t_0$ the system operates within the system assumptions. Let C be the bound on the maximum convergence time;

$\Delta_{Local\_Timer}(t)$, for real time t, be the maximum difference of values of the local timers of any two good nodes $N_i$ and $N_j$, where $N_i$, $N_j \in K_G$, and $K_G$ is the set of all good nodes; and $\Delta_{Precision}$, also referred to as self-stabilization precision, be the guaranteed upper bound on the maximum separation between the local timers of any two good nodes $N_i$ and $N_j$ in the presence of a maximum of F faulty nodes, where $N_i$, $N_j \in K_G$.

A good node $N_i$ resets its variable Local_Timer$_i$ periodically but at different points in time than other good nodes. The difference of local timers of all good nodes at time t, $\Delta_{Local\_Timer}(t)$, is determined by the following equation while recognizing the variations in the values of the Local_Timer$_i$ across all good nodes:

$$\Delta_{Local\_Timer}(t) = \min((\text{Local\_Timer}_{max}(t) - \text{Local\_Timer}_{min}(t)),$$

$$(\text{Local\_Timer}_{max}(t - \lceil \Delta_{Precision} \rceil) - \text{Local\_Timer}_{min}(t - \lceil \Delta_{Precision} \rceil))),$$

where $$\text{Local\_Timer}_{min}(x) = \min(\{\text{Local\_Timer}_i(x) | N_i \in K_G\}),$$
$$\text{Local\_Timer}_{max}(x) = \max(\{\text{Local\_Timer}_i(x) | N_i \in K_G\}),$$

and there exist C and $\lceil \Delta_{Precision} \rceil$.

Convergence: $\Delta_{Local\_Timer}(C) \leq \Pi \Delta_{Precision} \rceil$.
Closure: $\forall t, t \geq C, \Delta_{Local\_Timer}(t) \leq \lceil \Delta_{Precision} \rceil$.

The values of C, $\lceil \Delta_{Precision} \rceil$, and the maximum value for Local_Timer$_i$, Local_Timer_Max, are determined to be:

$$C = (2P_T + P_M)\Delta_{AA};$$

$$\lceil \Delta_{Precision} \rceil = (3F - 1)\Delta_{AA} - D + \Delta_{Drift}; \text{ and}$$

$$\text{Local\_Timer\_Max} = P_T + P_M;$$

and the amount of drift from the initial precision is given by:

$$\Delta_{Drift} = ((1+\rho) - 1/(1+\rho))P_{Effective}\Delta_{AA}.$$

Note that since Local_Timer_Max $> P_T/2$ and since the Local_Timer is reset after reaching Local_Timer_Max (worst case wraparound), a trivial solution is not possible.

Byzantine-Fault Tolerant Self-Stabilizing Protocol for Distributed Clock Synchronization Systems The self-stabilization protocol of the present invention is illustrated in FIG. 7. The steps of FIG. 7 are executed by each node's state machine and set of monitors once every local oscillator tick. Specifically, the steps of FIG. 7A are executed by each monitor of each node, and the steps of FIGS. 7B and 7C are executed by the state machine of each node.

In FIG. 7A, a monitor receives a message from its corresponding source node, and determines the message type (i.e., Resync or Affirm). If the message is a Resync message, the monitor determines the validity of the message, as described above. If the Resync message is determined to be invalid, the monitor invalidates the Resync message and awaits the next message. If the Resync message is valid, the monitor validates the Resync message, stores the Resync message, and sets the state of the source node to Restore. The monitor then awaits the next message. If the message is an Affirm message, the monitor determines the validity of the message, as described above. If the Affirm message is determined to be invalid, the monitor invalidates the Affirm message and awaits the next message. If the Affirm message is valid, the monitor validates Affirm message, stores the Affirm message, and then awaits the next message.

The actions of the state machine are based on the state (i.e., Restore or Maintain) of the node in which the state machine is instantiated. If the node is in a Restore state, the steps of FIG. 7B are executed. If the node is in a Maintain state, the steps of FIG. 7C are executed. Referring now to FIG. 7B, if the node is in a Restore state, the state machine determines if the value of the State_Timer is $\geq P_T$ (i.e., whether the TimeOut Restore( ) function is True). If yes, the state machine transmits a Resync message, resets the State_Timer, Resets the DeltaAA_Timer, and resets the Accept_Event_Counter. The node remains in the Restore state.

If the value of the State_Timer is not $\geq P_T$, the state machine determines if the value of the DeltaAA_Timer is $\geq \Delta_{AA}$ (i.e., whether the TimeOutAcceptEvent( ) function is True). If the value of the DeltaAA_Timer is not $\geq \Delta_{AA}$, the node remains in the Restore state. If the value of the DeltaAA_ Timer is $\geq \Delta_{AA}$, the state machine transmits an Affirm message and resets the DeltaAA_Timer. The state machine then determines if $\geq T_A$ valid messages (either Resync or Affirm) have been received. If no, the node remains in the Restore state. If $\geq T_A$ valid messages have been received, the state machine consumes the valid messages, clears the source node state status, and increments the Accept_ Event_Counter. The state machine then determines whether the transitory conditions (described above) have been met. If no, the node remains in the Restore mode. If the transitory conditions have been met, the node resets the State_Timer and transitions to the Maintain state.

Referring now to FIG. 7C, if the node is in a Maintain state, the state machine determines if the value of the State_Timer is $\geq P_M$ (i.e., whether the TimeOutMaintain( ) function is True). If no, the state machine determines if $\geq T_R$ nodes have transitioned out of a Maintain state. If $\geq T_R$ nodes have transitioned out of a Maintain state, or if the value of the State_Timer is $\geq P_M$, the state machine transmits a Resync message, resets the State_Timer, Resets the DeltaAA_Timer, and resets the Accept_Event_Counter. The node then transitions to a Restore state.

If not more than $\geq T_R$ nodes have transitioned out of a Maintain state, the state machine determines if the value of the DeltaAA_Timer is $\geq \Delta_{AA}$ (i.e., whether the TimeOutAcceptEvent( ) function is True). If the value of the DeltaAA_ Timer is not $\geq \Delta_{AA}$, the node remains in a Maintain state. If the value of the DeltaAA_Timer is $\geq \Delta_{AA}$, the state machine determines if $\geq T_A$ valid messages (either Resync or Affirm) have been received. If $\geq T_A$ valid messages have been received, the state machine consumes the valid messages. If not $\geq T_A$ valid messages have been received (or if $\geq T_A$ valid messages have been received, and after the valid messages have been consumed), the state machine determines if the value of the State_Timer is equal to $\Delta_{Precision}$. If the value of the State_Timer is equal to $\Delta_{Precision}$, the state machine resets the Local_Timer. Regardless of the value of $\Delta_{Precision}$, the state machine transmits an Affirm message and resets the DeltaAA_Timer. The node remains in a Maintain state.

In a variation of this protocol and in conjunction with a higher level mechanism, a good node stops transmitting Affirm messages after it is determined by the higher level mechanism that the system has stabilized. Such variation preserves the self-stabilization properties. However, such optimization in the number of exchanged self-stabilization messages is at a cost of delaying error detection, introducing jitters in the system, and prolonging the self-stabilization process.

Overhead of the Protocol

Since only two self-stabilization messages, namely Resync and Affirm, are required for the proper operation of this protocol, a single bit suffices to represent both messages. Therefore, for a data message w bits wide, the self-stabilization overhead will be 1/w per transmission. The continual aspect of the protocol requires reaffirmation of self-stabilization status of good nodes by periodic transmission of Affirm messages at $\Delta_{AA}$ intervals. As a result, the maximum number of self-stabilization messages transmitted within any time interval is deterministic and is a function of that time interval. In particular, a good node transmits at most $P_{Effective}/\Delta_{AA}$ self-stabilization messages during a period of $P_{Effective}$, where, $P_{Effective}$=time difference between any two consecutive resets of the Local_Timer $P_{Effective} \leq P_M+6F$ Therefore, the number of messages sent by a node=$P_{Effective}/\Delta_{AA}$ and the total number of messages sent by K nodes=$K\, P_{Effective}/\Delta_{AA}$.

Achieving Tighter Precision

Since the self-stabilization messages are communicated at $\Delta_{AA}$ intervals, if $\Delta_{AA}$, and hence $\Delta_{Precision}$, are larger than the desired precision, the system is said to be "Coarsely Synchronized." Otherwise, the system is said to be "Finely Synchronized." If the granularity provided by the self-stabilization precision is coarser than desired, a higher synchronization precision can be achieved in a two step process. First, a system from any initial state has to be Coarsely Synchronized and guaranteed that the system remains Coarsely Synchronized and operates within a known precision, $\Delta_{Precision}$. The second step, in conjunction with the Coarse Synchronization protocol, is to utilize a proven protocol that is based on the initial synchrony assumptions to achieve optimum precision of the synchronized system as illustrated in FIG. 8. As depicted in FIG. 8, the Coarse Synchronization protocol initiates the start of the Fine Synchronization protocol if a tighter precision of the system is desired. The Coarse protocol maintains self-stabilization of the system while the Fine Synchronization protocol increases the precision of the system.

Simulations and Model Checking

The topology considered is a system of four nodes, as shown in FIG. 9, such that all nodes can directly communicate with all other nodes, where K=4, G=3 and F=1. With D=1 and d=0, and $\Delta_{AA}$=D+d=1, the number of states needed to represent all possible combinations of initial states for the entire four-node system is approximately $7 \times 10^{30}$ states. The Symbolic Model Verifier (SMV) was able to handle all possible scenarios and the protocol was exhaustively model checked for this system.

Applications

The self-stabilizing protocol of the present invention is expected to have many applications as well as many theoretical implications. Embedded systems, distributed process control, synchronization, inherent fault tolerance which also includes Byzantine agreement, computer networks, the Internet, Internet applications, security, safety, automotive, aircraft, wired and wireless telecommunications, graph theoretic problems, leader election, and time division multiple access (TDMA) are a few examples. These are some of the many areas of distributed systems that can use self-stabilization in order to design more robust distributed systems.

CONCLUSIONS

The protocol of the present invention is scalable with respect to the fundamental parameters, K, D, and d. The self-stabilization precision $\Delta_{Precision}$, $\Delta_{Local\_Timer}(t)$, and self-stabilization periods $P_T$ and $P_M$ are functions of K, D and d. The convergence time is a linear function of $P_T$ and $P_M$ and deterministic. As K increases so does the number of monitors instantiated in each node. Also, as K increases so does the number of communication channels in a system of fully connected communication network. Therefore, although there is no theoretical upper bound on the maximum values for the fundamental parameters, implementation of this protocol may introduce some practical limitations on the maximum value of these parameters and the choice of topology.

Symbols $\rho$ bounded drift rate with respect to real time
d network imprecision
D event-response delay
F sum of all faulty nodes
G sum of all good nodes
K sum of all nodes
$K_G$ set of all good nodes
Resync self-stabilization message
Affirm self-stabilization message
R abbreviation for Resync message
A abbreviation for Affirm message
$T_A$ threshold for Accept( ) function
$T_R$ threshold for Retry( ) function
Restore self-stabilization state
Maintain self-stabilization state
T abbreviation for Restore state
M abbreviation for Maintain state
$P_{T.min}$ minimum period while in the Restore state
$P_T$ period while in the Restore state
$P_M$ period while in the Maintain state
$\Delta AA$ time difference between the last consecutive Affirm messages
$\Delta RR$ time difference between the last consecutive Resync messages
C maximum convergence time
$\Delta Local\_Timer(t)$ maximum time difference of Local_Timers of any two good nodes at real time t
$\Delta_{Precision}$ maximum self-stabilization precision
$\Delta Drift$ maximum deviation from the initial synchrony
$N_i$ the $i^{th}$ node
$M_i$ the $i^{th}$ monitor of a node Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed as new and desired to be secured by Letters Patent of the United States is:

1. A system capable of self-stabilizing from an arbitrary state in the presence of a bounded number of Byzantine faults, the system comprising:
 a plurality of nodes in communication with each other node, each node comprising:
  a state machine:
  a plurality of monitors, a quantity of monitors being equal to one less than a quantity of nodes, each monitor in communication with the state machine, each monitor configured to receive self-stabilization messages from a different corresponding node and configured to determine a current state of the corresponding node;
  a local physical oscillator; and
  two logical time clocks driven by the local physical oscillator;
  wherein the state machine is configured to describe a current state of the node, the current state comprising either a maintain-state or a restore-state;
  wherein the state machine is configured to transmit self-stabilization messages to all other nodes, the self-stabilization messages comprising either a Resync message indicating that the node is attempting to engage in resynchronization with all other nodes or an Affirm message indicating that the node is transitioning to another state in an attempt to synchronize or indicating that the node is currently synchronized;

wherein the state machine transitions the node from the maintain-state to the restore-state if a predefined number of valid Resync messages have been received;

wherein the state machine transitions the node from the restore-state to the maintain-state if (1) the node is in the restore-state, (2) a predefined number of events have occurred within a same number of predefined time intervals, each event occurring when a predefined number of valid self-stabilization messages have been received by the monitors within one predefined time interval, and (3) the monitors have not received a valid Resync message during a most recent event occurrence;

wherein the system does not comprise a central clock used by the nodes for self-stabilization; and wherein the nodes do not use an externally generated global pulse for self-stabilization.

2. The system of claim 1, wherein each state machine is configured to transmit the Resync message when the state machine transitions the node from the maintain-state to the restore-state or when a Resync timeout occurs.

3. The system of claim 1, wherein each state machine is configured to transmit the Affirm message when the predefined number of valid self-stabilization messages have been received by as many of the corresponding monitors within an Affirm timeout interval or when the Affirm timeout interval has lapsed.

4. The system of claim 3, wherein the Affirm timeout interval equals a time difference between two most recent consecutive Affirm messages received from a good node during steady state.

5. The system of claim 4, where the predefined number of valid self-stabilization messages equals one minus a sum of all good nodes.

6. The system of claim 1, wherein the predefined number of valid Resync messages equals one plus a sum of all faulty nodes.

7. The system of claim 1, wherein the predefined number of events equals two times a sum of all faulty nodes.

8. The system of claim 1, wherein the predefined number of valid self-stabilization messages equals one minus a sum of all good nodes.

9. The system of claim 1, wherein the predefined time intervals equal a time difference between two most recent consecutive Affirm messages received from a good node during steady state.

10. The system of claim 1, wherein the monitors are further configured to determine if the received self-stabilization messages are valid and to store most recently received valid messages.

11. The system of claim 1, wherein the two logical time clocks comprise a State Timer and a Local timer, wherein the State Timer is incremented once every time difference between two most recent consecutive Affirm messages received from a good node during steady state, wherein the State Timer is reset either (1) when the state machine transitions the node from the maintain-state to the restore-state or (2) when the state machine transitions the node from the restore-state to the maintain-state, wherein the Local Timer is incremented once every tick of the local physical oscillator, wherein the Local Timer is reset either (1) when the Local Timer reaches a predefined maximum allowed value or (2) when the node has transitioned to the Maintain state and remained in the Maintain state for $\lceil \Delta_{Precision} \rceil$ ticks of the local physical oscillator, and wherein $\Delta_{Precision}$ is a maximum guaranteed self-stabilization precision of the system.

12. A method of self-stabilizing a system from an arbitrary state in the presence of a bounded number of Byzantine faults, the system comprising a plurality of nodes, each node comprising a state machine and a plurality of monitors, the method comprising the steps of:

providing the plurality of nodes in communication with each other node, each node comprising:

a state machine;

the plurality of monitors, the quantity of monitors being equal to one less than the quantity of nodes, each monitor in communication with the state machine;

a local physical oscillator; and two logical time clocks driven by the local physical oscillator;

wherein the state machine is configured to describe a current state of the node, the current state comprising either a maintain-state or a restore-state;

receiving, in each monitor, self-stabilization messages from a different corresponding node;

determining, by each monitor, a current state of the corresponding node;

transmitting, by each state machine, self-stabilization messages to all other nodes, the self-stabilization messages comprising either a Resync message indicating that the node is attempting to engage in self-stabilization with all other nodes or an Affirm message indicating that the node is transitioning to another state in an attempt to synchronize or indicating that the node is currently synchronized;

transitioning, by each state machine, the node from the maintain-state to the restore-state if a predefined number of valid Resync messages have been received;

transitioning, by the state machine, the node from the restore-state to the maintain-state if (1) the node is in the restore-state, (2) a predefined number of events have occurred within a same number of predefined time intervals, each event occurring when a predefined number of valid self-stabilization messages have been received by the monitors within one predefined time interval, and (3) the monitors have not received a valid Resync message during a most recent event occurrence;

wherein the method does not comprise use of a central clock by the nodes for self-stabilization; and wherein the method does not comprise use of an externally generated global pulse by the nodes for self-stabilization.

13. The method of claim 12, further comprising:

transmitting, by each state machine, the Resync message when the state machine transitions the node from the maintain-state to the restore-state or when a Resync timeout occurs.

14. The method of claim 12, wherein each state machine is configured to transmit the Affirm message when a the predefined number of valid self-stabilization messages have been received by as many of the corresponding monitors within the Affirm timeout interval or when an Affirm timeout interval has lapsed.

15. The method of claim 14, wherein the Affirm timeout interval equals a time difference between two most recent consecutive Affirm messages received from a good node during steady state.

16. The method of claim 14, where the predefined number of valid self-stabilization messages equals one minus a sum of all good nodes.

17. The method of claim 12, wherein the predefined number of valid Resync messages equals one plus a sum of all faulty nodes.

18. The method of claim 12, wherein the predefined number of events equals two times a sum of all faulty nodes.

19. The method of claim 12, the predefined number of valid self-stabilization messages equals one minus a sum of all good nodes.

20. The method of claim 12, wherein the predefined time intervals equal a time difference between two most recent consecutive Affirm messages received from a good node during steady state.

21. The method of claim 12, further comprising:
   determining, by the monitors, if the received self-stabilization messages are valid; and
   storing, by the monitors, most recently received valid messages.

22. The method of claim 12, wherein the two logical time clocks comprise a State Timer and a Local timer, and wherein the method further comprises:

incrementing the State Timer once every time difference between two most recent consecutive Affirm messages received from a good node during steady state;

resetting the State Timer either (1) when the state machine transitions the node from the maintain-state to the restore-state or (2) when the state machine transitions the node from the restore-state to the maintain-state;

incrementing the Local Timer once every tick of the local physical oscillator; and resetting the Local Timer either (1) when the Local Timer reaches a predefined maximum allowed value or (2) when the node has transitioned to the Maintain state and remained in the Maintain state for $\lceil \Delta_{Precision} \rceil$ ticks of the local physical oscillator, wherein $\Delta_{Precision}$ is a maximum guaranteed self-stabilization precision of the system.

\* \* \* \* \*